April 28, 1970 R. R. YOUNG 3,508,668
LOAD TRANSFERRING APPARATUS
Filed June 11, 1968 6 Sheets-Sheet 1

INVENTOR.
ROBERT R. YOUNG
BY Leo J. Catello
ATTORNEY

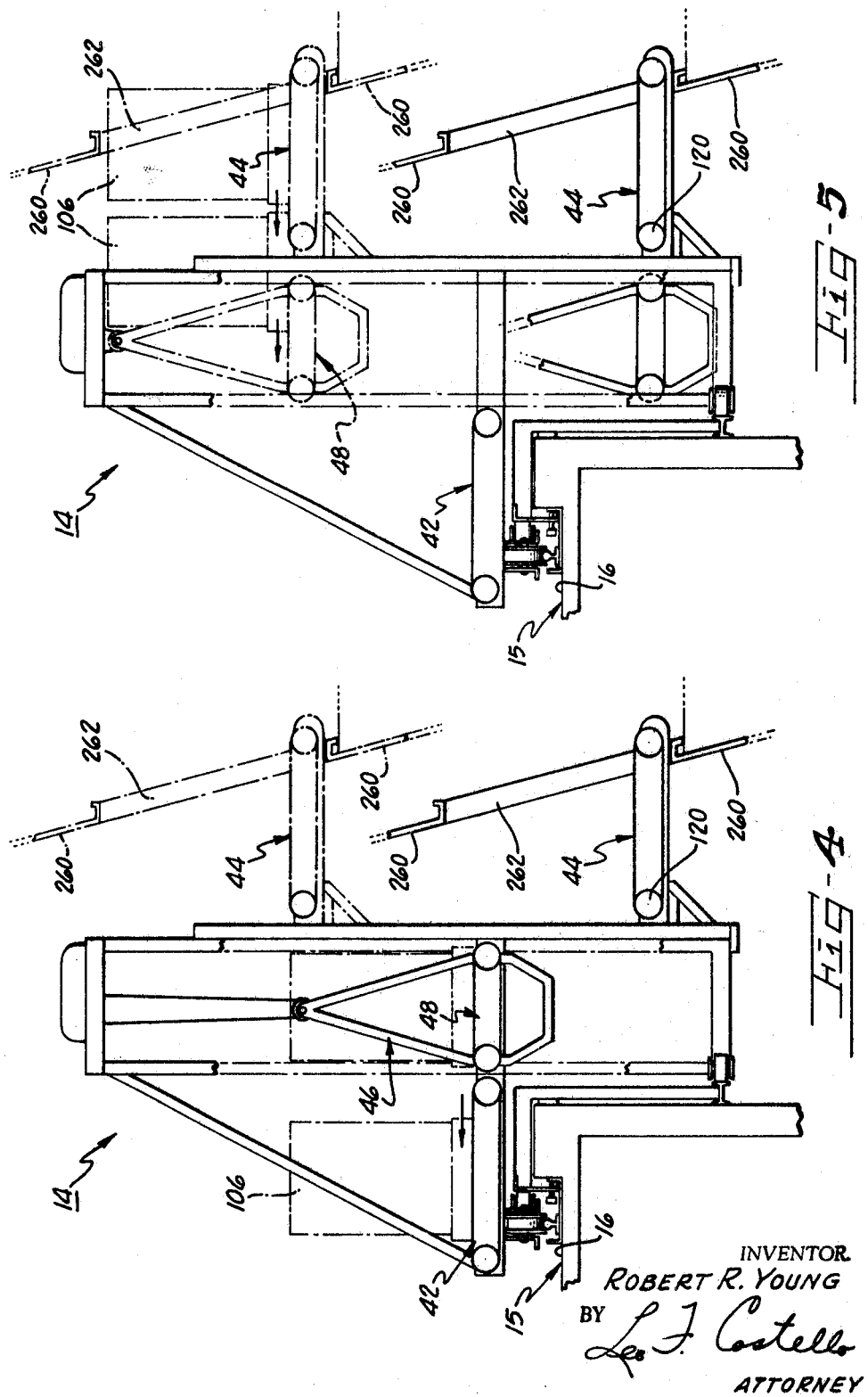

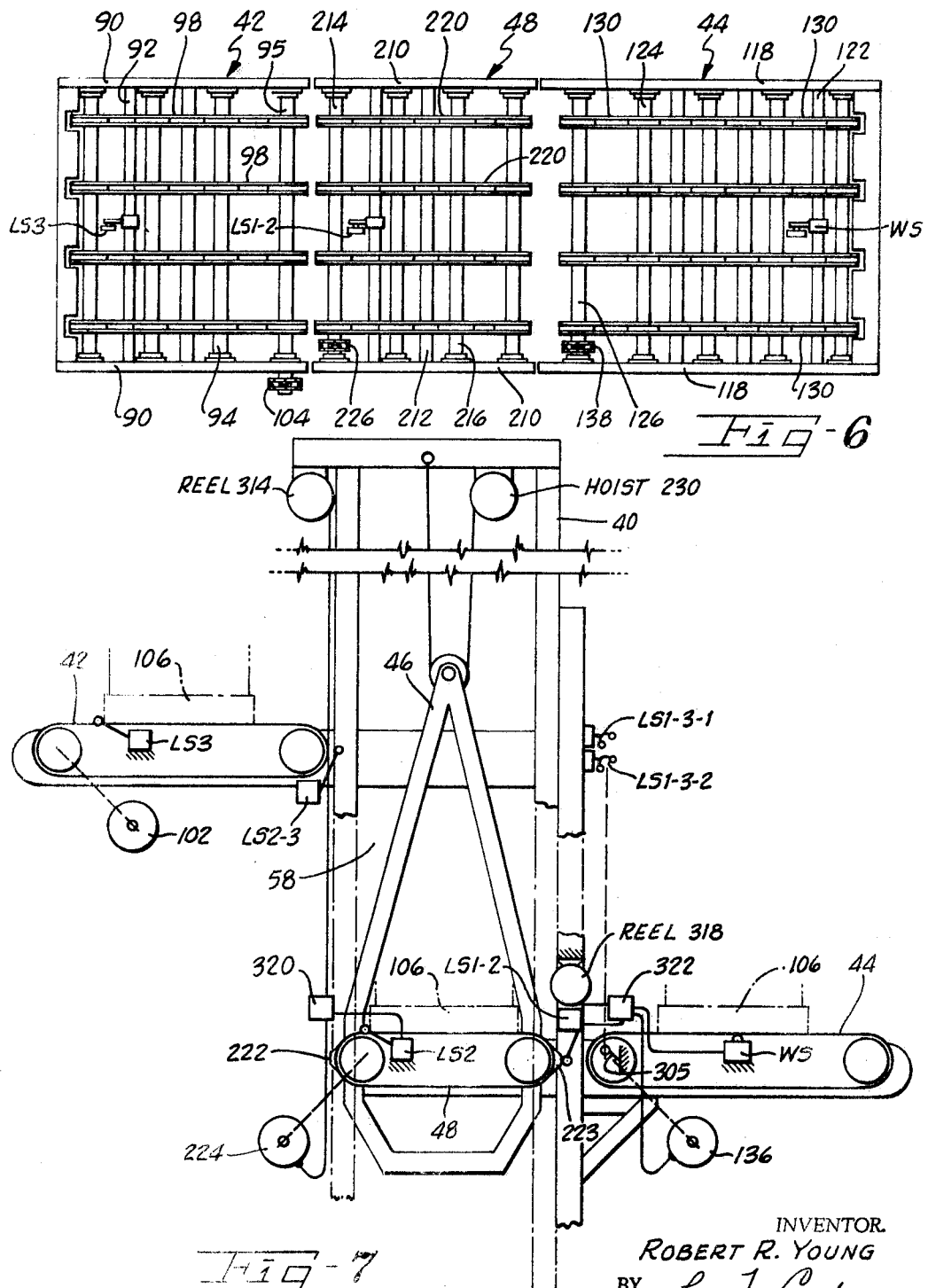

INVENTOR.
ROBERT R. YOUNG
BY Leo J. Costello
ATTORNEY

United States Patent Office  3,508,668
Patented Apr. 28, 1970

3,508,668
LOAD TRANSFERRING APPARATUS
Robert Ross Young, Danville, Calif., assignor to Kaiser Industries Corporation, Oakland, Calif., a corporation of Nevada
Filed June 11, 1968, Ser. No. 736,058
Int. Cl. B65g 67/58
U.S. Cl. 214—14                                    6 Claims

ABSTRACT OF THE DISCLOSURE

An apparatus for transferring loads between a fixed elevation on a dock and various elevations on a carrier, such as a ship, including a dockside conveyor positioned on the dock, a carrier conveyer adapted to project into a side port of the ship, to the open deck or to other selected positions on or in the ship, and an elevator conveyor movable between a first position aligned with the dockside conveyer for transferring a load between the dockside conveyer and the elevator conveyer and a second position aligned with the carrier conveyor so as to transfer a load between the carrier conveyor and the elevator conveyer.

Background of the invention

The present invention pertains to a load transferring apparatus and more particularly to an apparatus for transferring cargo between a location on a dock and selected positions in a cargo carrier which positions are elevationally displaced and subject to variation with respect to said location on the dock.

The apparatus of the present invention is especially suited for use in the transfer of palletized cargo unitized cargo, or individual boxes, cases, barrels and the like between a dock and a ship moored at the dock. At the present time, most cargo is loaded on and unloaded from ships at sea terminals by cranes or booms on the dock and/or the ship. Cables attached to the crane or boom are fastened in various well-known ways to the load whereupon the same is moved both horizontally and vertically into the desired position either on the dock or the deck of the ship.

This conventional method of handling cargo has its disadvantages in that considerable manpower is required to fasten the cable to the load, to unfasten the same, and to guide the load into the desired position. Moreover, this load handling method is unsuited for transferring loads through side ports of the vessels.

Efforts have been made to solve certain problems associated with crane loading, as evidenced by United States Patents Nos. 1,736,877 and 3,341,034. In general, the equipment of these patents includes an elevator which transfers the loads between a fixed elevation on the dock and a hold or various decks of the ship. The prior art apparatus, however, is unsatisfactory for transferring loads through side ports of a ship or for dependably and automatically moving a load carrying elevator from a dockside position to a shipside position which is subject to change in accordance with the rise and fall of the tide.

Summary of the invention

Accordingly, the present invention pertains to an apparatus, capable of automatic operation, having a load supporting member projectable into load transferring relation with a load receiving or holding portion of a carrier and adapted to accommodate rise and fall of the carrier while maintaining said relation, and an elevator movable alternatively between load transferring positions relative to the dock and to said load supporting member.

Brief description of the drawing

FIGS. 4 and 5 are diagrammatic operational views showing how the apparatus is used for transferring loads between a dock and a ship.

FIG. 6 is a plan view of the three conveyers incorporated in the disclosed apparatus, it being noted that supporting framework has been omitted.

FIG. 7 is a diagrammatic view showing in particular the controls for enabling automatic operation of the subject apparatus.

Detailed description

Figure 1:
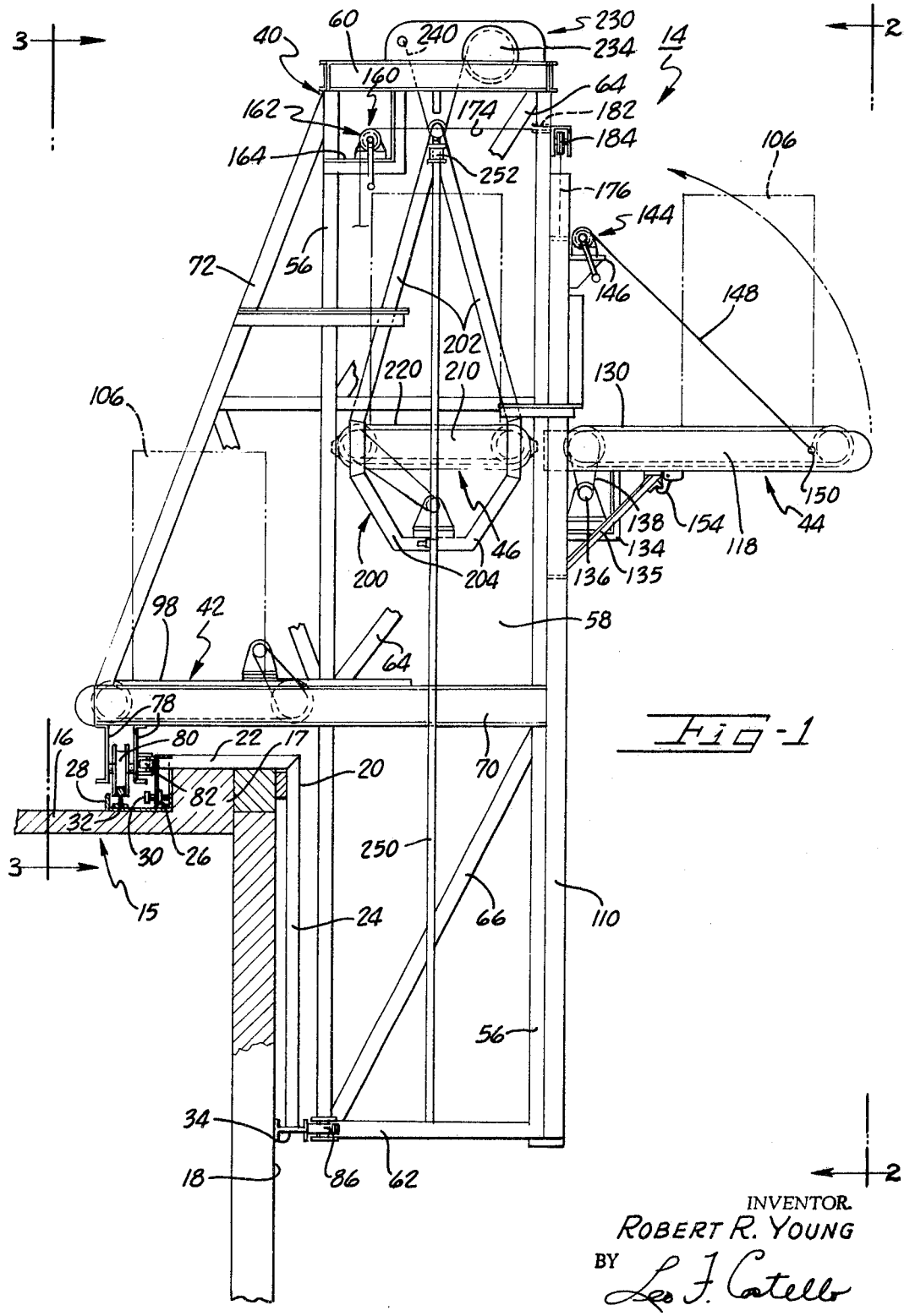
FIG. 1 is a side elevation of a load transferring apparatus embodying the principles of the present invention, with the apparatus being shown on a dock, which is partially in section, and with loads supported thereon being shown by dashed lines.

The load transferring apparatus of the present invention is generally indicated by the number 14 in FIG. 1 and is especially suited for use on a dock 15. The dock has a main horizontal surface 16 and a stringer 17 which is raised slightly from the main surface, and a front surface 18 extending vertically downward from the stringer. The subject apparatus includes an inverted, generally J-shaped dock frame 20 having a cap portion 22 fitted over the stringer and a dependent leg portion 24 projecting downward along the surface 18 of the dock. The cap portion includes a vertical bearing plate 26 extending downward along the inner surface of the stringer and a channel member 28 extending outward along the main surface of the dock from the bearing plate. The dock frame is releasably attached to the dock by a clamp 30 which extends through the bearing plate and releasably engages the stringer in order tightly to clamp the dock frame to the dock. An upper rail 32 is secured in the channel member and extends lengthwise of the stringer, as best seen in both FIGS. 1 and 3. A lower rail 34 is secured to the lower end of the leg portion 24 and also extends lengthwise of the stringer.

In brief, the load transferring apparatus 14 includes a main frame 40 (FIG. 1), a dockside conveyer 42 mounted in the main frame and projecting over the cap portion 22 of the dock frame 20, a shipside conveyer 44 mounted in the main frame for elevational movement and projecting outward or away from the dock 15, and an elevator 46 including an intermediate conveyer 48 mounted in the main frame for elevational movement between a dockside position with the dockside and intermediate conveyers substantially coplanar (FIG. 4) and shipside positions (FIGS. 1, 5 and 7) wherein the intermediate and shipside conveyers are coplanar.

The main frame 40 of the subject apparatus 14 includes four upright corner posts 56 arranged in rectangular relation to each other thereby to define an elevator shaft or passage 58. These corner posts are rigidly interconnected in the defined relationship by top and bottom longitudinal and transverse members 60 and 62 and by diagonal braces 64 and 66. The main frame also has a pair of transversely spaced horizontal beams 70 provided with outer portions rigidly connected to the outside of the corner posts 56 and inner portions projecting away from the corner posts substantially perpendicularly thereto. Struts 72 interconnect the top of the inner corner posts and the inner ends of the beams for rigidifying the main frame.

The main frame 40 is mounted on the dock frame 20 for movement therealong lengthwise of the stringer 17. For this purpose, brackets 78 (FIGS. 1 and 3) are secured to the underside of the beams 70 and are joined by a cross piece 79 having slots 79 therein to accommodate a fork lift. Vertically disposed upper wheels 80 are individually journalled in these brackets and ride on the upper rail 32. Horizontal rollers 82 are also mounted on the brackets and ride against the bearing plate 26 which is part of the dock frame. Furthermore, legs 84 project laterally from the inner posts 56, and leg wheels 86 are mounted on these legs and ride along the lower rail 34. It will be understood, therefore, that the main frame can be moved along the dock if sufficient force is applied to the main frame. Ordinarily, however, the weight of the main frame and its supported structure will cause it to remain in whatever position it is placed.

The dockside conveyer 42 includes a pair of transversely spaced horizontal side plates 90 (FIGS. 3 and 6) rigidly interconnected by cross members 92 and mounted between the beams 70 on the cross piece 79 and a similar cross piece, not shown, attached to the inner posts 56. Idler shafts 94 and a drive shaft 95 are journalled in bearings supported in the side plates and extend therebetween. A plurality of sprockets 96 are secured to each shaft 94 and 95, and roller chains 98 extend around aligned sprockets so as to provide upper runs in a common plane slightly above the beams 70. A dockside platform 100 (FIG. 3) extends between one of the beams and one of the side plates 90, and a motor 102 is supported on this platform and has a driving connection 104 to the drive shaft 95 of the dockside conveyer. This motor is reversible in order to impart movement to the upper runs of the chains in an inward direction, that is toward the dock 15 and away from the elevator 46, as well as away from the dock and toward the elevator. When the motor is de-energized the chains of course are motionless. It is to be noted that the plurality of idler shafts and their associated sprockets, as well as the chains, provide a firm support surface for a load to be transferred, such as a box 106 shown in dashed outline in FIGS. 1 and 3.

For mounting the shipside conveyer 44 in the main frame 40, a pair of upright guide channels 110 (FIGS. 1, 2 and 6) are secured in transversely spaced relation to the outer corner posts 56 of the main frame. The shipside conveyer includes a pair of upright mounting bars 112, shorter than the guide channels but individually disposed adjacent to the guide channels. Rollers 114 are attached to the upper and lower ends of the mounting bars and fit in the guide channels for guiding movement of the bars upward and downward along the guide channels and thus lengthwise of the elevator shaft 58. Transversely spaced side plates 118 have trunnions 120 at their inner ends which are pivotally connected to the mounting bars 112 for movement about a common horizontal axis. The side plates 118 are interconnected by cross members 122 (FIG. 6), and idler and drive shafts 124 and 126 are journalled in bearings mounted in the side plates. Sprockets 128 (FIG. 2) are secured to each shaft, and chains 130 extend around the sprockets, all in a manner similar to the dockside conveyer 42. An underframe 134 (FIGS. 1 and 2) is suspended from the side plates 118, and a motor 136 on this underframe has a drive connection 138 to the drive shaft 126 so as to impart movement alternatively in opposite directions to the upper runs of the chains 130.

Figure 2:
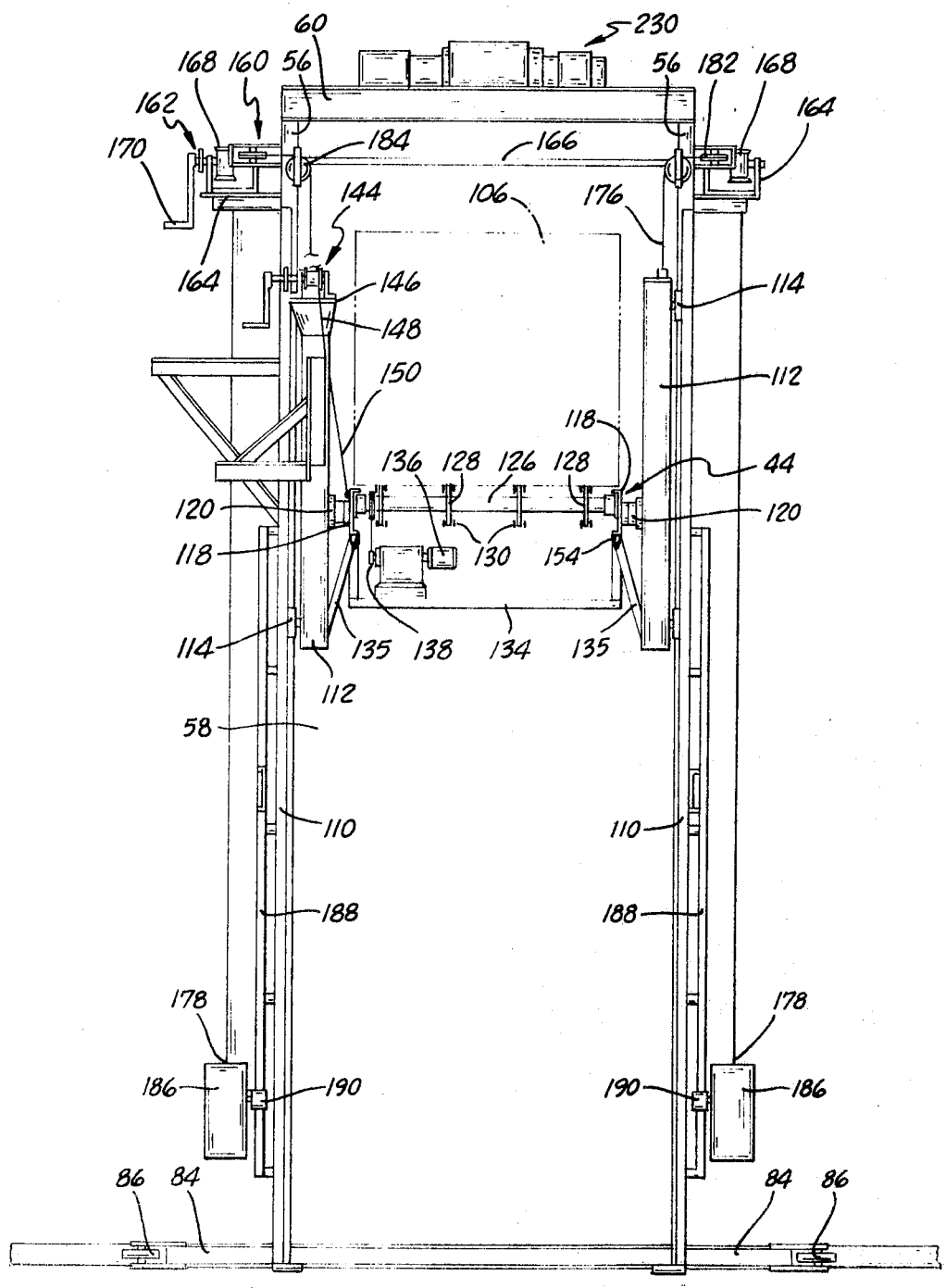
FIG. 2 is a front elevation as viewed from a position indicated by line 2—2 in FIG. 1, but with the dock omitted.

The shipside conveyer 44 is pivotable along the arc indicated in FIG. 1 between a projected position, as shown in FIGS. 1 and 2, and a retracted position, not shown, wherein it extends upward from the trunnions 120 in substantially parallel relation to the mounting bars 112. For effecting this pivotal movement, a pivoting winch 144 is mounted on a unit platform 146, the latter being attached to one of the mounting bars 112. The winch includes a cable 148 which has an end 150 connected to the outer portion of one of the side plates 118 of the shipside conveyor. The winch also includes a crank 152 for paying the cable in and out to move the shipside conveyer between its projected and retracted positions. In its projected position, the shipside conveyer rests on support brackets 135, and latches 154 releasably hold the conveyor on these brackets.

For controlling the elevational (as distinguished from pivotal) movement of the shipside conveyor 44, a conveyer hoist 160 (FIGS. 1 and 2) is provided. This hoist includes an elevating winch 162 which is supported on auxiliary frames 164 that project outward from the inner corner posts 56 and the top members 60 of the main frame 40. The winch has a horizontal shaft 166 (FIG. 2) which is parallel to the conveyer drive shaft 126, and drums 168 are secured to opposite ends of this shaft outside of the main frame. A crank 170 is attached to one end of the shaft for rotating the drums. Cables 174 are wrapped around the drums and have opposite end portions 176 and 178. The end portions 176 of the cables pass around horizontal and vertical pulleys 182 and 184 supported on the outer corner posts 56 and then downward where they connect to the upper ends of the mounting bars 112. The other end portions 178 of the cables extend downward from the drums and connect to counterweight 186 which move up and down along the outside of the inner corner posts. For guiding the travel of these counterweights, guide rods 188 are mounted on the inner corner posts, and sleeves 190 secured to the counterweights slide along the guide rods. It is thus evident that by rotating the main winch, the shipside conveyer 44 can be raised and lowered along the length of the guide channels 119 between upper and lower positions, as illustrated in FIGS. 4 and 5. The counterweights 186, of course, counterbalance the shipside conveyer and thus facilitate movement thereof by manual operation of the winch 162. The winches 144 and 162 can be locked to hold the shipside conveyer in a particular position, if desired, usually for stowing purposes.

The elevator 46 (FIGS. 1 and 3) includes a sub-frame 200 having opposed pairs of upwardly converging struts 202 and downwardly converging struts 204, the upper struts being joined by a top beam 206, and the lower struts being rigidly interconnected by a lower bar 208. The intermediate conveyor 48 includes a pair of side plates 210 rigidly interconnecting the junctures of the upper and lower struts, and cross members 212 (FIG. 6) rigidly interconnect the side plates 210. As with the conveyers 42 and 44, the intermediate conveyer also has drive and idler shafts 214 and 216, sprockets 218, and endless chains 220. Dockside and shipside cams 222 and 223 project endwardly from the side plates 210 for a purpose to be described. A motor 224 is supported on the lower bar 208, and a driving connection 226 interconnects the motor and the drive shaft 214 of the intermediate conveyer in order to impart movement alternatively in either the inward or the outward direction to the upper runs of the chains 220.

Figure 3:
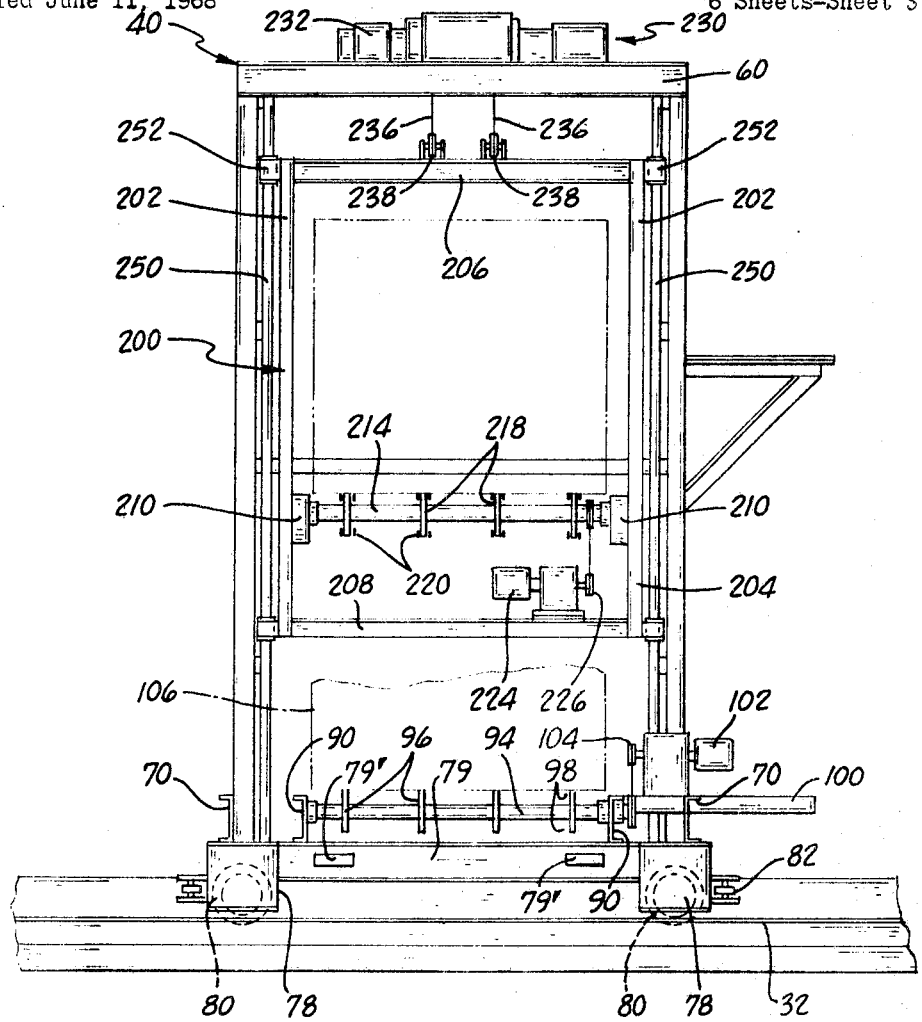
FIG. 3 is a rear elevation as viewed from a position indicated by line 3—3 in FIG. 1.

In order to raise and lower the elevator 46, an elevator hoist 230 is supported on the top members 60 of the main frame 40. This hoist includes an upward hoist motor 232 and a downward hoist motor 233 each having an output shaft to which is connected a drive pulley 234. Cables 236 are wound around these drive pulleys, are trained around idler pulleys 238 secured to the top beam 206 of the elevator's sub-frame 200, and have ends 240 connected to the elevator hoist above the main frame. The elevator is constrained to travel in a rectilinear path upwardly and downwardly within the elevator shaft 58 by guide poles 250 that are secured to the main frame 40 and positioned between and in parallel relationship to the corner posts 56 and slightly within the elevator shaft, as best illustrated in FIGS. 1 and 3. Bushings 252 are secured to the upper and lower struts 202 and 204 and slide on the guide poles. It will be noted that in guiding the elevator along a rectilinear path, the upper runs of the chains 220 on the intermediate conveyer 48 are maintained in a perpendicular plane with respect to the guide poles and the elevator shaft.

Therefore, the intermediate conveyer 48 is mounted in the main frame 40 for movement between a dockside position (FIG. 4) wherein the upper runs of the chains 220 are in substantially the same horizontal plane as the upper runs of the chains 98 of the dockside conveyer 42, and a shipside position (FIG. 5) wherein the upper runs of the chains of the intermediate conveyer are in substantially the same horizontal plane as the upper runs of the chains 130 of the shipside conveyer 44. The dockside position of the intermediate conveyer is the home position thereof. There are of course a plurality of shipside positions of the intermediate conveyer depending on the position of the shipside conveyer. That is, in one complete cycle of operation of the intermediate conveyer, it moves from its dockside position to its shipside position, whether that be above or below its dockside position, and then returns to the dockside position.

Dockside and shipside platforms 256 and 258 are attached to the main frame 40 and are accessible by ladder, not shown, by workmen for operating, monitoring or maintaining the apparatus.

The operation of the subject load transferring apparatus 14 is briefly described at this point. First of all, the condition of the apparatus when not being used for loading or unloading is to be noted. The elevator 46 is positioned so that the intermediate conveyer 48 is in its dockside position. The shipside conveyer 44 is held in its retracted position by the pivoting winch 144; the shipside conveyer may be placed in any elevational positioned desired, but it is retracted so as to permit docking or shoving off of a ship. Furthermore, none of the conveyers 42, 44 or 48 is energized so that their respective chains 98, 130 and 220 are stationary.

With particular reference to FIGS. 4 and 5, it is assumed that a ship, a portion of the hull of which is indicated by the number 260, is moored at the dock 15. It is further assumed that the ship is loaded and/or is in low tide so that its port 262, through which loading or unloading is to take place, is below the level of the main dock surface 16.

In order to condition the subject load transferring apparatus 14 for loading or unloading the ship, the main frame 40 is moved along the dock frame 20, if required, in order to place the conveyers 42, 44 and 48 in substantially the same transverse plane as the port 262. Next, the shipside conveyer 44 is raised or lowered, as required, by the elevating winch 162 to position the trunnions 120 just above the lower edge of the bottom port. Thereafter, the pivoting winch 144 is operated to move the shipside conveyer into its projected position wherein it now projects into the ship through the port 262, it being noted in FIGS. 4 and 5 that the shipside conveyer is short enough to pivot between its retracted and projected positions through the port. The shipside conveyer rests on the lower edge of the port, is held in its projected position by the latches 154, but is free to be moved elevationally (not pivotally) by forces imposed on the conveyer by the edge of the port and thereby accommodate rise and fall of the ship. The entire frame 40 can be moved lengthwise of the dock, to accommodate fore and aft movement of the ship, by forces imposed of the conveyer 44 by the edge of the port.

Figure 8:
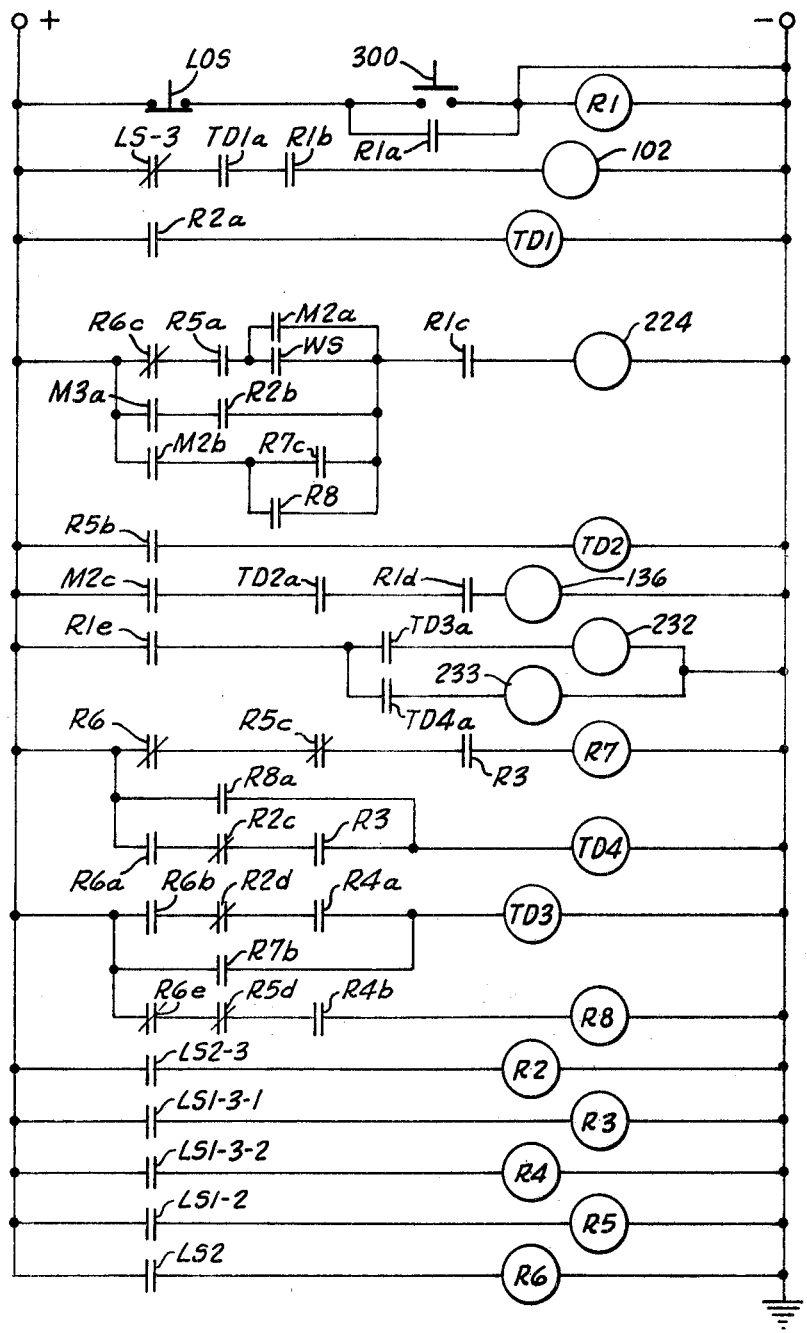
FIG. 8 is a circuit diagram of the electrical controls incorporated in the present apparatus.

With particular reference to FIGS. 7 and 8, but with continued reference to FIGS. 4 and 5, the manner in which a ship is unloaded with the subject apparatus is now described.

The start button 300 is closed thereby energizing relay R1 which closes its contacts R1a, b, c, d and e. R1a is a holding contact for maintaining relay R1 energized after the start button is released. Assuming that the intermediate conveyer 48 has been moved out of its stowed or home position and is in alignment with the shipside conveyer 44 (FIG. 7), the shipside cam 223 is in contact with switch LS1–2 closing the same. When LS1–2 is closed, relay R5 is energized closing its contacts R5a and opening its contacts R5c and d.

A load, as 106, from the ship is moved out through the port 262 and placed on the shipside conveyer 44 depressing and closing the weight switch WS. Closure of switch WS completes the circuit to the motor 224 thereby energizing the intermediate conveyer 48 and causing the upper runs of its chains 220 to travel toward the dock 15, that is toward the left in FIG. 7. It should also be noted that energization of the motor 224 closes its contacts M2a, M2b and M2c, contacts M2a constituting the holding circuit when the load 310 is disengaged from and thus opens the weight switch WS. Closure of contacts M2c completes the circuit to motor 136, it being remembered that contacts R1d are closed and it being noted that contacts TD2a are closed because its relay coil TD2 is energized when contacts R5b are closed in the above explained manner. Energizing motor 136 causes the upper runs of the chains 130 of the shipside conveyer 44 to move toward the intermediate conveyer 48 and to transfer the load 106 from the shipside conveyer onto the intermediate conveyer.

When the load 106 is entirely within the elevator shaft 58 and is thus generally centrally positioned on the intermediate conveyer 48, the load strikes the limit switch LS2, closing the same. Closure of switch LS2 energizes relay R6 thereby closing its contacts R6a and b and opening its contacts R6c, d and e. The principle function of relay LS2 at this point in the operation of the apparatus is to de-energize both of the conveyer motors 136 and 224 and to energize the upward hoist motor 232. Since contacts R6c are opened, the intermediate conveyer motor 224 is de-energized thereby opening its contacts M2c and de-energizing shipside conveyer motor 136.

Briefly to interrupt the description of the operation, it is to be noted that reels 314 and 318 are mounted on the main frame 40 and carry electrical conductors leading to junction boxes 320 and 322, respectively on the elevator 46 and the shipside conveyer 44, to facilitate making electrical connections to the motors 224 and 136 and to the switches LS2, LS1–2 and WS.

In order to energize the upward hoist motor 232, it is necessary to close contacts TD3a, it being remembered that contacts R1e are initially closed by closure of the start button 300. Contacts TD3a are closed by energizing its relay TD3 through closed contacts R6b (closed because their relay R6 is energized when the load 106 closes switch LS2), the normally closed contacts R2d (normally closed when their relay R2 is de-energized with the intermediate and dockside conveyers 48 and 42 out of alignment) and closed contacts R4a (closed because its relay R4 is energized by closure of switch LS1–3–2 which is closed when the shipside conveyer 44 is positioned more than a predetermined distance below the dockside conveyer). Thus, the upward hoist motor 232 is energized to raise the elevator and the load 106.

When the dockside cam 222 strikes the limit switch LS2–3, relay R2 is energized to close its contacts R2a and b and to open its contacts R2c and d. Opening of R2d de-energizes the relay TD3 which, in turn, opens its contacts TD3a to de-energize the upward hoist motor 232 and stop the elevator 46 at a position with the intermediate conveyer 48 in alignment with the dockside conveyer 42. Closure of contacts R2a energizes the relay TD1 to close its contacts TD1a and thus energize the dockside conveyer motor 102 to cause the upper runs of the chains 98 to travel away from the intermediate conveyer, that is to the left in FIG. 7. When motor 102 is energized, it closes contacts M3a thereby to re-energize the intermediate conveyer motor 224 through the previously closed contacts R1c and the now closed contacts R2b; once again, the intermediate conveyer travels in the same direction as previously and moves the load 106 from the intermediate conveyer onto the dockside conveyer, the latter carrying the load until it strikes the limit switch LS3 which opens and de-energizes the dockside conveyer motor 102. With the motor 102 de-energized, its contacts M3a open and de-energize the intermediate conveyer motor 224.

As soon as the load 106 passes by and disengages the limit switch LS2 (on the elevator 46), LS2 opens thereby de-energizing relay R6 to open its contacts R6a and b and to close its contacts R6c, d and e. One of the functions desired at this point is to return the intermediate conveyer 48 to a position of alignment with the shipside conveyer 44. Thus, it is necessary to energize the downward hoist motor 233, this being accomplished by closing the contacts TD4a. The relay TD4, associated with contacts TD4a, is energized through contacts R8a which are closed by energizing relay R8. The latter relay is energized by closure of contacts R6e (closed by de-energizing relay R6 when the load disengages limit switch LS2 as explained above), by closure of contacts R5d (closed because relay R5 is de-energized since the intermediate and shipside conveyers are not in alignment) and by closure of contacts R4b (closed as above explained, because the shipside conveyer is more than a predetermined distance below the dockside conveyer thereby closing limit switch LS1–3–2 and energizing relay R4). Thus, the downward hoist motor 233 is energized to lower the intermediate conveyer, now empty, toward and eventually into alignment with the shipside conveyer.

When the shipside cam 223 engages the limit switch LS1–2, relay R5 is energized to close its contacts R5a and b and to open its contacts R5c and d thereby to precondition the apparatus for moving another load 106 from the shipside conveyor 44 onto the intermediate conveyer 48 when the next load is placed on the shipside conveyer and causes depression of the weight switch WS. Such a subsequent load can be placed on the shipside conveyer while the elevator is transferring the first load to the dockside conveyer and returning to the shipside conveyer and thereby be ready to be moved onto the intermediate conveyer when the latter engages the switch LS1–2.

It will therefore be evident that, after depressing the start button 300 and placing a load 106 on the shipside conveyer 44, the intermediate conveyer 48 automatically moves between positions of alignment with the shipside conveyer and the dockside conveyer 42 thereby to transfer loads from the shipside conveyer to the dockside conveyer. If preferred, of course, the apparatus is readily adaptable for more manual control instead of being automatically controlled as described.

Although not specifically described herein, it will be understood how the apparatus operates when the shipside conveyer 44 is located above the dockside conveyer 42. In such position, the limit switch LS1–3–2 is opened by lever 305 (FIG. 7) at the shipside conveyer and the limit switch LS1–3–1 is closed, by such lever, the effect of this being to cause the intermediate conveyer to move upward from the dockside conveyer toward and into alignment with the upwardly positioned shipside conveyer and, vice versa, to cause the intermediate conveyer to move downward from the shipside conveyer into alignment with the dockside conveyer.

It will further be understood that the apparatus can readily be adapted for loading a ship, that is automatically transferring a load from the dockside conveyer 42 to the shipside conveyer 44 and thus into the hold of a ship. The circuit shown in FIG. 8 is intended for controlling the unloading of a ship, but similar circuitry is used for loading the ship.

From the foregoing, it will be evident that load transferring apparatus has been provided which enables the transfer of loads between a dock and a carrier, such as a ship, and particularly through a lateral opening of the carrier wherein the elevation of such opening varies among carriers and loading conditions and is variable during the loading or unloading operation. Furthermore, the apparatus lends itself to automatic operation whereby the transfer of loads is effected more economically and rapidly.

What is claimed is:

1. In an apparatus for transferring loads between a dock and a carrier at the dock, said apparatus including a frame positioned on the dock and a dockside load supporting means mounted in the frame and projecting over the dock; the combination of carrier load supporting means, means mounting the carrier load supporting means in the frame so as to project into load transferring relation to a carrier at the dock, said means mounting the carrier load supporting means for elevational movement above and below the level of the dockside load supporting means so that said carrier load supporting means can be adjusted to project into the carrier at various elevations, means for imparting elevational movement to the carrier load supporting means, intermediate load supporting means, means mounting said intermediate load supporting means in the frame for elevational movement between a home position substantially coplanar with said dockside load supporting means and a plurality of load transferring positions in each of which said intermediate and carrier load supporting means are substantially coplanar, means for motivating said intermediate means between said positions, and means responsive to movement of the carrier load supporting means above and below the level of the dockside load supporting means for causing the motivating means to move the intermediate load supporting means toward the carrier load supporting means each time the intermediate load supporting means moves away from said home position irrespective of whether the carrier load supporting means is above or below said level.

2. The apparatus of claim 1 wherein said responsive means includes means on the frame and the carrier load supporting means interengageable during movement of the carrier load supporting means above and below said level.

3. The apparatus of claim 1 wherein said means for imparting elevational movement to the carrier load supporting means is adapted to permit free floating movement of the carrier load supporting means to enable the latter to follow elevational movement of the carrier relative to the dock, and means for counterbalancing the weight of the carrier load supporting means.

4. In an apparatus for transferring loads between a carrier and a dock which has a generally vertical surface positioned to face the carrier at the dock, said apparatus comprising a support having a main portion extending downward along said surface between the dock and the carrier and an inner portion projecting from the main portion over the dock, said main portion providing a substantially vertical elevator shaft extending therein above and below said inner portion, a dock loading member mounted on said inner portion and projecting inward of said elevator shaft toward and over the dock, a carrier loading member projecting outward from said elevator shaft and being mounted on said support for elevational movement lengthwise of said shaft, means for controlling the elevational movement of said carrier loading member, elevator means elevationally movable in said shaft for transferring loads between said carrier loading member and said dock loading member, wherein said dock has a main surface and a cap extending above the main surface and outward to said vertical surface, a dock frame of inverted J-shape having an upper portion fitting over said cap and a lower portion projecting downward along said vertical surface of the dock, means on said inner portion of said support rollably bearing against said upper portion of the dock frame, and means on the dependent portion of the support rollably bearing against the leg portion of the dock frame.

5. An apparatus for automatically transferring loads between a ship and a dock, said dock having a generally vertical surface which faces a ship berthed at the dock and a generally horizontal surface, comprising a generally upright frame having an inner portion projecting over the dock, a lower portion projecting down along said vertical surface and an upper portion aligned with the lower portion and projecting upward therefrom above said horizontal surface, said upper and lower portion defining an upright elevator shaft extending above and below said inner portion, the frame providing an opening on the shipside of the frame communicating with the elevator shaft and extending substantially the full length thereof, means on said inner and lower portions for mounting said frame on the dock, a dockside conveyer mounted on said inner portion, a shipside conveyer mounted on the frame for movement along substantially the full length of said opening above and below the dockside conveyer and projecting from the shipside of the frame, and elevator in the shaft, an intermediate conveyer mounted on the elevator, means mounting the elevator for movment between a first position with said intermediate conveyer aligned with the dockside conveyer and a second position aligned with the intermediate conveyer aligned with the shipside conveyer, and means for imparting cyclical movement to the elevator wherein one complete cycle includes movement of the elevator from said first position to said second position, irrespective of whether the shipside conveyer is above or below the dockside conveyer, and return to said first position.

6. The apparatus of claim 5 including first drive means for motivating the shipside conveyer, second drive means for motivating the dockside conveyer, third drive means for motivating the intermediate conveyer, fourth drive means for raising and lowering the elevator, first load responsive means responsive to a load on the shipside conveyer for actuating said first and third drive means to transfer a load from the shipside conveyer to the intermediate conveyer when the elevator is in its second position, second load responsive means on the elevator for deactivating said first and third drive means and activating said fourth drive means when said transferred load is fully disposed on the intermediate conveyer to cause said elevator to be moved to said first position, first switch means operable in the first position of the elevator for deactivating said fourth drive means and activating said second and third drive means to transfer said fully disposed load from the intermediate conveyer to the shipside conveyer, third load responsive means responsive to the presence of the transferred load on the dockside conveyer for deactivating the second and third drive means and activating the fourth drive means to return the elevator to its second position, and second switch means operable in the second position of the elevator for deactivating the fourth drive means upon movement of the elevator into the second position preparatory to another load being transferred from the shipside conveyer to the intermediate conveyer.

References Cited

UNITED STATES PATENTS

| 1,164,143 | 12/1915 | Swift. | |
|---|---|---|---|
| 1,525,950 | 2/1925 | Prescott | 214—14 |
| 1,736,877 | 11/1929 | Dalin et al. | 214—14 |
| 1,911,015 | 5/1933 | Crabbe et al. | 214—16.1 |
| 2,656,940 | 10/1953 | Sumners et al. | 214—16.1 |

FOREIGN PATENTS 1,034,411   6/1966   Great Britain.

GERALD M. FORLENZA, Primary Examiner

F. E. WERNER, Assistant Examiner

U.S. Cl. X.R.

214—16.4